April 20, 1971     F. C. ARRANCE ETAL     3,575,727
BATTERY SEPARATOR PRODUCTION AND BATTERY
Filed May 8, 1968
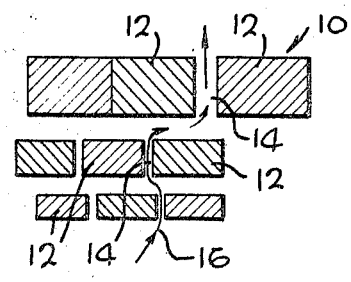
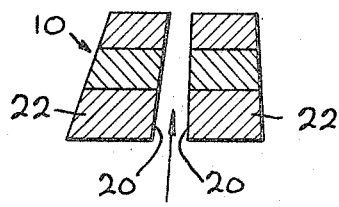
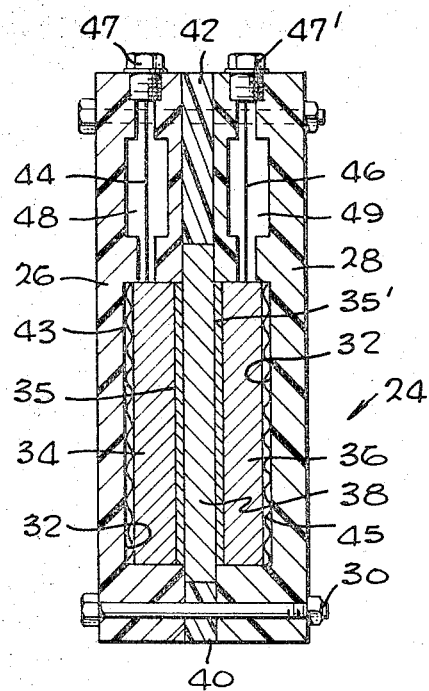
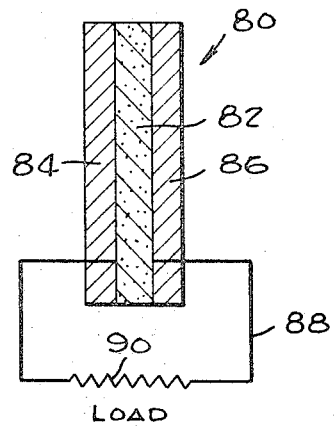
LOAD
FRANK C. ARRANCE
CARL BERGER
       INVENTORS
BY *Max Golden*
    ATTORNEY United States Patent Office 3,575,727
Patented Apr. 20, 1971

3,575,727
BATTERY SEPARATOR PRODUCTION
AND BATTERY
Frank C. Arrance, Costa Mesa, and Carl Berger, Santa
Ana, Calif., assignors to McDonnell Douglas Corporation, Santa Monica, Calif.
Filed May 8, 1968, Ser. No. 727,394
Int. Cl. H01m 3/02
U.S. Cl. 136—146
11 Claims

ABSTRACT OF THE DISCLOSURE

Production of inorganic porous sintered battery separator consisting essentially of a solid solution of magnesium oxide and a minor portion of certain additive oxides of an element capable of entering the magnesium oxide crystal lattice, such as zirconium oxide, chromic oxide, and aluminum oxide, by procedure including sintering high purity magnesium oxide, e.g., at a temperature of about 1200° C., mixing such sintered magnesium oxide with a minor portion of a compound of the type noted above, e.g., chromium oxide, grinding such mixture, preferably under anhydrous conditions such as in the presence of absolute alcohol, to small particle size, preferably less than 5 microns, presintering such ground mixture, e.g., at a temperature of about 1200° C., cooling and again grinding the presintered mixture, preferably in the presence of absolute alcohol, to the above noted fine particle size, compacting such ground presintered mixture into separator membranes, finally sintering the separator membranes, e.g., at a temperature of about 1400° C. rapidly cooling to an intermediate temperature, e.g., of the order of about 1000° C., and then slowly cooling said finally sintered membranes to ambient temperature. The resulting separators have high resistance to alkali, have high mechanical strength, and are particularly valuable for use in high rate batteries.

Figure 2:
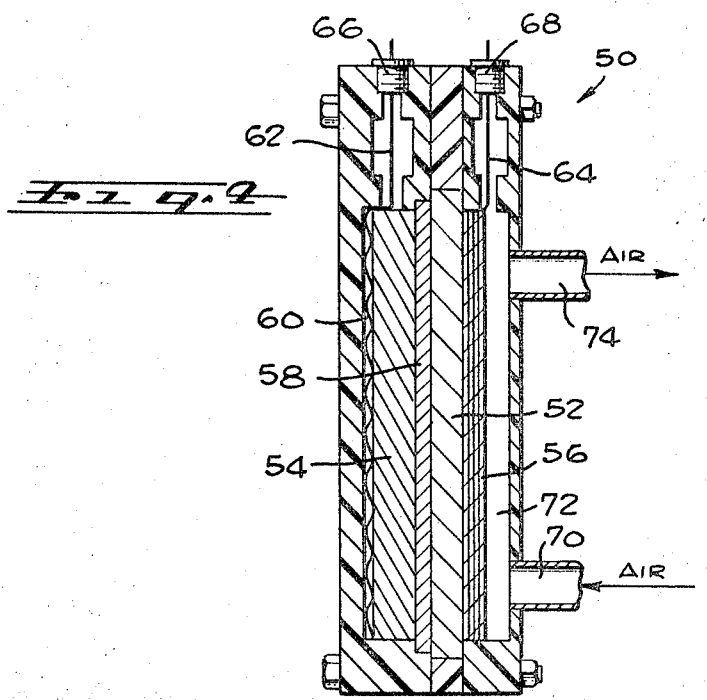

This invention relates to batteries, particularly high energy density batteries and thermal batteries, and is especially concerned with improved inorganic membranes or separators for use in batteries, particularly high energy density and thermal batteries, such separators having improved strength and resistance to alkali, and good porosity characteristics, with procedure for producing such separators, and with improved battery constructions embodying such improved separators, said separators being particularly designed for use in secondary batteries capable of a large number of charge-discharge cycles at ambient and at elevated temperature and having improved voltage characteristics during discharge.

Batteries are an important source of energy storage for power generation in air-borne systems. An important type of battery particularly suited for such applications are the high energy density alkaline electrolyte cells using such electrode combinations as silver-zinc, silver-cadmium and nickel-cadmium. Another recently developed high energy type battery is the so-called metal-air or metal-oxygen battery, such as the zinc-air battery. High energy density batteries of these types are generally battery systems which have a substantially higher energy per unit of weight than conventional batteries, e.g., lead storage batteries. Thus, high energy density batteries can develop, e.g., 100 to 140 watt hours of energy per pound. In addition to important air-borne applications, such high energy density batteries have many other applications such as in portable tools and appliances, television, radio and record players, engine starting, portable X-ray units, and the like.

Other types of batteries which are presently gaining importance are thermal batteries which are operable at high temperatures, and which employ fused electrolytes such as molten potassium hydroxide and potassium carbonate, and fused salts such as eutectic potassium chloride-lithium chloride electrolyte.

In batteries of the above types, the separator performs the function of retaining electrolyte, e.g., potassium hydroxide, separating the electrodes, and preventing migration of electrode ions or growth of dendritic crystals of electrode ions which short circuit the battery. It has been known to employ organic separators in such batteries, but these have several disadvantages. Thus, such organic separators are not chemically stable, especially at temperatures above 50° C.; they tend to swell excessively at elevated temperatures; and most organics are not readily wetted by caustic solutions. Further, organics are not inert to silver oxide in caustic solutions, and organic materials are generally soft and pliable and are subject to puncture by dendrite growth.

To avoid the disadvantages inherent in the use of organic separators, various types of inorganic separators have been developed which, when assembled in a battery, e.g., a silver-zinc high energy density battery, have resulted in substantially improved battery life at both ambient temperature and elevated temperature, that is, a battery capable of operating efficiently over a large number of discharge-charge cycles, and such batteries are also operable at high temperatures, e.g., of the order of 100° C. and above.

Thus, for example, in our copending application Ser. No. 555,891, filed June 7, 1966, now Patent No. 3,446,669, there is described and claimed improved inorganic separators in the form of a sintered porous solid solution of a major proportion of an aluminum-bearing material such as aluminum oxide, and a substance selected from the group consisting of chromium, cobalt, nickel, magnesium, calcium and iron-bearing materials, e.g., a mixture of a major proportion of alumina and chromic oxide.

However, the continued development of inorganic separators having improved strength and improved resistance to alkali and fused salt electrolytes employed in high energy density batteries, and having high porosity, for incorporation in high energy density batteries to obtain improved battery performance, such as high discharge voltage and improved impact, vibration and environmental characteristics, is of particular interest to the industry.

U.S. Pat. 3,174,881 to McEvoy describes production of a sintered magnesium oxide plate as catalytic fuel electrodes for use in high temperature fuel cells to form a matrix to hold the electrolyte for the fuel cell. However, it has been found that the resulting magnesium oxide disc or plate is relatively soft and fragile and cannot be successfully employed as a battery separator.

In U.S. Pat. 2,422,045 to Ruben there is disclosed primary dry cells having a cathode and anode which are separated by a barrier disc, such disc being a porous spacer of inorganic materials such as pressed discs of magnesium hydroxide powder. However, such spacers are ineffective for use in secondary batteries, and particularly have insufficient strength for such use and are not resistant to alkali and fused salts, particularly for use in thermal batteries.

We have now found, according to the invention, that improved separators especially useful for employment in alkaline batteries and fused salt electrolytes can be produced by controlled sintering of pure magnesium oxide to produce high overall porosity, but with pore sizes of molecular dimensions, followed by controlled addition to such sintered pure magnesium oxide of certain additives which can enter the magnesium oxide lattice, such as zirconium, titanium, chromium, aluminum and iron.

When such a mixture is properly sintered, there is formed a single phase solid solution which, upon proper cooling, forms a separator structure which has high mechanical strength, high resistance to KOH and to fused salts, such as lithium chloride-potassium chloride, has high gross porosity (low resistivity) and which has good voltage and electrical characteristics rendering such separators especially valuable for use in high rate batteries.

Thus, the invention provides a battery separator comprising a porous membrane consisting essentially of a solid solution of a major proportion of magnesium oxide, and a minor proportion of an oxide of an element capable of entering the magnesium oxide crystal lattice, e.g., an oxide of the above noted elements such as zirconium oxide or chromic oxide.

The improved solid solution separators of the invention are produced by a process which comprises sintering magnesium oxide to a temperature in the range of about 600° to about 1400° C., mixing the sintered magnesium oxide with a minor proportion of a compound of an element capable of entering the magnesium oxide crystal lattice, such compound on heating being capable of forming an oxide of such element, grinding the mixture substantially to a particle size less than about 5 microns, presintering the ground mixture to a temperature in the range of from about 1000° to about 1800° C., cooling and again grinding such presintered mixture substantially to a particle size less than about 5 microns, compacting the ground sintered mixture into separator membranes, finally sintering such separator membranes at a temperature in the range of about 1100 to about 1800° C., cooling the finally sintered separator membranes rapidly to a temperature at least about 200° C. below the final sintering temperature, and thereafter slowly cooling the finally sintered separator membranes to about ambient temperature.

In carrying out the process, substantially pure magnesium oxide, which can be calcined or fused magnesia, is first sintered at controlled temperature. The magnesium oxide employed is preferably at least 99% pure, such high purity magnesia containing very minor amounts of impurities such as silica, iron, calcium oxide and aluminum oxide.

However, a lower purity magnesium oxide can be employed, but the results are inferior. The preferably high purity magnesia is first sintered to a temperature in the range of about 600° to about 1400° C., e.g., for a period of about one to about four hours, and then cooled to produce a material having high overall or gross porosity, but with pore sizes of molecular dimensions. During such controlled sintering, the magnesium oxide crystallizes in the form of cubic, face centered lattices, having substantially perfect cleavage planes parallel to the "100" plane.

It is conventional in describing crystals to assume certain lines passing through the center of ideal crystals as axes of reference. These lines are called the crystallographic axes and are taken parallel to the intersection of major crystal faces. Except for those falling in the hexagonal system, three axes are used. The "$a$" axis runs from front to back in a horizontal position; the "$b$" axis runs from right to left, also in a horizontal position; and the "$c$" axis is vertical to "$a$" and "$b$." Crystal surfaces which are parallel to an axis are designated as "0" (i.e., they do not intersect the axis). Surfaces which intersect an axis at a unit distance are designated as "1." Thus, a 100 plane is one which intersects the "$a$" axis at a distance of 1 and is parallel to the "$b$" axis (1$\underline{0}$0) and parallel to the "$c$" axis (10$\underline{0}$), the number "1" being an arbitrary figure expressing the relative length of the crystallographic axis. (See Dana's Manual of Mineralogy, 17th ed., pp. 22–27).

Thus, for example, sintering high purity magnesium oxide to 1200° C. produces magnesium oxide crystals of about 0.1 to about 1.0 micron (m$\mu$) size. By such controlled sintering as previously noted, a structure can be provided which has high gross porosity but very small pores formed by cleavage within the crystal lattice.

Thus, such controlled heating and cooling of the high purity magnesia enhances development of such crystal cleavage and the resulting defect structure, as illustrated in FIG. 1 of the drawing. According to the drawing, numeral 10 designates a layer of magnesium oxide crystals which upon sintering form cleavage planes 12 containing microscopic pores or cracks therebetween, as indicated at 14, which are of molecular size. The random orientation of the cleavage planes provides interconnected molecular passages or pores 14 between adjacent pairs of cleavage planes, as indicated by the arrow 16.

The formation of the above illustrated defect structure of the magnesium oxide upon sintering, to produce the microscopic pores or cracks as indicated at 14, permits the introduction into such microscopic cracks of minor proportions of certain additives formed of an element having the proper size to enter the magnesium oxide crystal lattice and form a single phase solid solution with the magnesium oxide.

Thus, there is added to the sintered magnesia any suitable compound of an element which is capable of entering the magnesium oxide crystal lattice, and which compound on heating is capable of forming an oxide of the element. Preferably the oxide of such element is initially employed. The element to be combined with the magnesium oxide should have an atomic size within about 12% of the atomic size of magnesium in order to permit such element to enter the micropores of the magnesium oxide defect structure formed on sintering the magnesium oxide, as noted above. Elements having this property are zirconium, chromium, aluminum, titanium, iron, yttrium, zinc, scandium, tin, nickel, manganese, lanthanum, cobalt and cerium. Although these elements preferably are employed in the form of their oxides, the carbonates, sulfates and chlorides of such elements can also be employed, since such compounds upon heating or sintering in the presence of air will be converted to the corresponding oxides. Thus, the additive can be a substance selected from the group consisting of $ZrO_2$, $Cr_2O_3$, $Al_2O_3$, $TiO_2$, $Fe_2O_3$, $Y_2O_3$, $ZnO$, $Sc_2O_3$, $SnO_2$, $NiO$, $MnO_2$, $La_2O_3$, $CoO$ and $CeO_2$. The preferred additive elements for introduction into the magnesium oxide lattice are zirconium, chromium, aluminum, titanium and iron, preferably in the form of their oxides noted above. Mixtures of the additives also can be employed, such as a mixture of zirconium oxide and chromium oxide.

The mixture of sintered magnesium oxide and additive comprises a major proportion of the magnesium oxide and a minor proportion of the additive. Generally about 1 to about 40 molar percent, preferably about 2 to about 15 molar percent, of the additive compound based on the total molecular weight of the magnesium oxide-additive combination is employed, an optimum amount of additive being about 5 molar percent in combination with about 95 molar percent of the magnesium oxide. Thus, for example, a combination of about 90 mole percent magnesium oxide and 10 mole percent of the additive oxide, e.g., titanium dioxide, can be employed.

The mixture of sintered magnesium oxide and additive is then subjected to grinding to reduce the size of the particles of the mixture to a fineness such that at least 95% of the particles have a size less than 5 microns, and preferably less than 1 micron. This is accomplished by carrying out the grinding operation under substantially anhydrous conditions to prevent hydration of the magnesium oxide to magnesium hydroxide. Thus, such grinding can be carried out with the mixture in the dry state, but preferably is carried out in absolute alcohol. The major portion of the particles can thus be ground to a particle size of from 0.1 to 1.0 micron. The ground mixture of magnesium oxide and additive, after drying to remove the alcohol used during grinding, is sintered by heating to a temperature between about 1000° and about 1800° C., preferably between about 1200° and about 1600° C., for a period of about one to about three hours. Such presintering forms a solid solution of the magnesium oxide and the additive, e.g., zirconium oxide or chromic oxide, by entry of the metal element of the additive into the micropores formed in the defect structure of the magnesium oxide, as noted above. The resulting presintered mixture is then cooled slowly to approximately ambient temperature. As illustrated in FIG. 2 of the drawing, upon cooling of the solid solution, some of the additive leaves the crystal lattice 10 and crystallizes along the cleavage planes, indicated at 20, between the magnesium oxide crystal layers 22. This crystallization of the additive outside the crystal lattice during the cooling is believed to result in enhanced strength and molecular porosity of the solid solution structure.

The resulting solid solution of magnesium oxide and additive is then reground under anhydrous conditions, as described above, preferably with absolute alcohol, e.g., in a ball mill, to a particle size of a fineness such that at least 95% of the particles are less than 5 microns diameter, preferably less than 1 micron, as noted above. After such granulation and drying to remove alcohol, the ground, presintered solid solution of magnesium oxide and additive is then compacted, e.g., at pressures ranging from about 2,000 to about 20,000 p.s.i., to form separator membranes of a predetermined thickness, e.g., about 0.010 to about 0.040 inch in thickness.

Such compacted separators are then sintered at a temperature ranging from about 1100° to about 1800° C. for a period, e.g., of about one to about four hours. The temperature of such final sintering is selected dependent on the desired porosity of the final separator membranes. In preferred practice the temperature of final sintering of the compacted sintered membranes is higher, e.g., about 100 to about 200° C. higher, than the temperature employed in the previous presintering of the mixture of magnesium oxide and additive. However, in some instances, depending upon the particular additive employed, and the particular porosity desired in the final separators, temperature of final sintering of the porous membranes can be lower, e.g., about 100° to about 200° C. lower, than the presintering temperature of the magnesium oxide-additive mixture.

The separators are finally sintered at the above noted temperature, preferably as rapidly as possible, then preferably are cooled rapidly, e.g. in from about 15 minutes to about 1 hour, to an intermediate temperature which is preferably at least 200° C. below the final sintering temperature. However, in preferred practice the separators are cooled from the final sintering temperature rapidly to a temperature between about 800 and about 1000° C. Thereafter, the separators are slowly cooled over a period of about 6 to about 12 hours down to room temperature.

The rapid cooling of the separators from the final sintering temperature to an intermediate temperature, e.g. of the order of about 1000° C. as noted above, is important in order to maintain the magnesium oxide and additive in the form of a solid solution. If such initial cooling from the final sintering temperature is carried out slowly there is a tendency to reject the additive, e.g. chromic oxide, from the crystal lattice so that it is no longer entrapped in the lattice, thereby altering the structure of the membrane and destroying the solid solution. Thus, the final sintering is carried out to develop strength and the physical characteristics of the solid solution formed during the presintering operation, and it is necessary after such final sintering to cool the separators sufficiently rapidly to freeze the solid solution structure. Thus, such rapid cooling is carried out to a temperature where the crystalline activity ceases and a high strength solid solution membrane results.

After such rapid cooling following final sintering, e.g. to a temperature of say 800 to about 1000° C., the resulting separator should then be cooled slowly over a relatively long period, as noted above, in order to avoid thermal contraction and cracking of the separator membranes.

The magnesium oxide-additive solid solution separators produced according to the invention have high transverse strength ranging from about 5,000 to about 15,000 p.s.i. and above. As previously noted, the porosity of the separator can be controlled to obtain a desired value, so that such porosity can range from about 10% to about 50%.

The solid solution separators of the invention have pore size characteristics permitting retention of electrolyte and passage of electrolyte ion such as hydroxyl ion, while preventing migration of electrode ions, e.g., silver ions through the separator. Pore sizes of the solid solution separators of the invention can range, e.g., from about 1 to about 300 angstroms, preferably from about 100 to about 250 angstroms.

The desired porosity and pore size of the invention separators can be obtained by control of the defect structure of the magnesium oxide, by use of a particular additive, by controlling the amount of the additive employed and by controlling the sintering and cooling cycles.

The structure of the solid solution separators of the invention can be readily identified by crystallographic and X-ray diffraction methods. See Dana's Manual of Mineralogy, 17th edition, pages 204 and 205.

The ground particulate solid solution of magnesium oxide and additive produced according to the invention, and in ground particulate form, can be employed as inorganic separator material used in flexible separators. These include, for example, the flexible separators described in our copending application Ser. No. 676,224, filed Oct. 18, 1967, and consisting, for example, of a porous inorganic material, which can be the above noted magnesium oxide-additive solid solution of the present invention, and a minor portion of a water coaguable organic fluorocarbon polymer such as a vinylidene fluoride polymer, to bond the particles of the inorganic material. Also, the above noted particulate solid solution of magnesium oxide and additive according to the invention can be employed as the inorganic material in the flexible separators described in copending application Ser. No. 676,233, filed Oct. 18, 1967 of Frank C. Arrance, and consisting for example of a major portion of such inorganic material, e.g. the above noted magnesium oxide-additive solid solution of the invention, a minor portion of potassium titanate, and a minor portion of a cured organic polymer such as polyphenylene oxide as bonding agent.

The following are examples of practice of the invention.

EXAMPLE 1

Fused magnesia powder was first sintered at a temperature of 1200° C. for a period of 2 hours.

The resulting sintered magnesia was then mixed with chromium oxide ($Cr_2O_3$) in the proportion noted below.

|  | Mol percent |
|---|---|
| Magnesia | 95.0 |
| Chromium oxide | 5.0 |
|  | 100.0 |

After oven drying to remove the alcohol, this mixture was sintered to 1200° C., and cooled and crushed to a fineness which passed through a 14 mesh standard screen. It was then reground with absolute alcohol for 15 hours to a fineness of 95% less than 5 microns. After oven drying and granulation, 2" x 2" x 0.025" thick separators were pressed at about 10,000 p.s.i. These separators were sintered to about 1400° C. in about 4 hours, rapidly cooled in about ½ hour to 1000° C., and then slowly cooled in about 12 hours to room temperature. The separators had a porosity of about 25% and a pore diameter ranging from about 10 to about 200 angstroms. The resulting separators had a resistivity of 4–7 ohm-cm., and strength of about 11,000 p.s.i.

Figure 3:
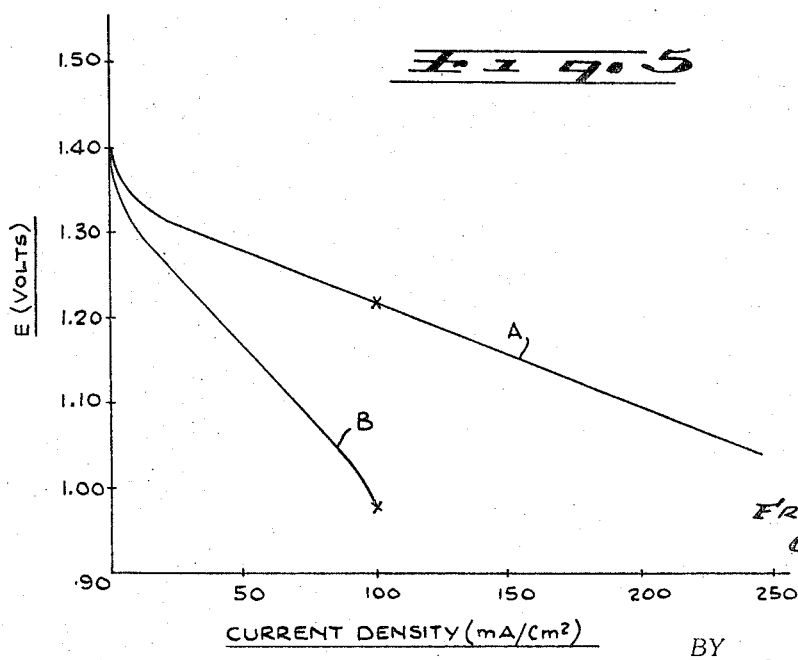

A separator prepared as described above and standard silver and zinc electrodes were assembled to form a battery as illustrated in FIG. 3 of the drawing, employing a plastic case 24 formed of two symmetrical, e.g., Teflon, half portions 26 and 28 which are bolted together as indicated at 30. Compartments 26 and 28 of the case have recesses 32 formed therein which receive the zinc and silver electrodes 34 and 36, respectively. A magnesium oxide-chromium oxide solid solution sintered separator 38 prepared as described above is disposed centrally between the case portions 26 and 28 so that the electrodes 34 and 36 are pressed against opposite surfaces of such separators, with a potassium titanate paper 35 inserted between the zinc electrode 34 and separator 38, and a similar potassium titanate paper 35' inserted between the silver electrode 36 and separator 38, to aid in supporting such electrodes. However, it will be understood that if desired, such potassium titanate papers can be omitted. Teflon spacers 40 and 43 are provided about the periphery of separator 38, to form a leak-proof seal. Nickel screens 43 and 45 are in contact with electrodes 34 and 36 adjacent to the bottom of the compartment recesses 32, and silver terminal wires 44 and 46 are connected respectively to the screens 43 and 45, and are brought through the plastic electrode sections at the top of the assembly and connected to terminals 47 and 47', as shown. Small electrolyte reservoirs 48 and 49 are provided in the upper portion of the respective electrode compartments 26 and 28.

A 30% aqueous solution of potassium hydroxide was added as electrolyte to the above described battery.

The cycle life of the battery using a 2 hour discharge and a 4 hour recharge regime, ranged from 75 to 250 cycles. In total discharge tests, battery life ranged from 35 to 80 cycles.

EXAMPLE 2

The magnesium oxide-chromium oxide solid solution separator prepared as described in Example 1 was tested in a zinc-air or zinc-oxygen battery of the type illustrated in FIG. 4. In the zinc-air battery 50 in FIG. 4, the magnesium oxide-chromium oxide separator 52 is disposed between a standard zinc electrode 54 and a gas diffusion or air electrode 56, which can be a platinum catalyst electrode of the American Cyanamid Type AA–1 or AB–40. A potassium titanate paper 58 is inserted between the zinc electrode 54 and the separator 52, and a silver collector screen 60 is pressed against the opposite surface of the zinc electrode 54. Leads 62 and 64 connect the zinc electrode collector screen 60 and the air electrode 56, to terminals 66 and 68, respectively. An air inlet 70 is provided for passage of air into chamber 72 and into contact with the air electrode 56, and an air outlet 74 is provided from chamber 72.

The zinc electrode 54 is wetted or saturated with 30% potassium hydroxide to an extent such that the battery can be tilted in any direction without any flow of electrolyte, to prevent flooding of the air electrode 56.

A battery of the type illustrated in FIG. 4 was tested on a 2 hour discharge and 4 hour recharge cycle at room temperature. The battery operated for 160 cycles without evidence of any separator impairment.

The voltage performance of the battery illustrated in FIG. 4 was tested against a battery of the same type, except employing a conventional cellulose separator, especially at high discharge rates. FIG. 5 of the drawing is a graph showing the performance of these respective batteries as a function of current density. From FIG. 5 it is seen that the voltage performance of the zinc-air battery employing magnesium oxide-chromium oxide solid solution separator of Example 1, as indicated by curve A, was highly superior to that of the conventional zinc-air battery employing a conventional cellulose separator as indicated by curve B. Thus, for example, at a current density of 100 ma./cm.$^2$, the voltage of the zinc-air battery employing the invention separator, illustrated by curve A, is about 1.20 volts, as compared to less than 1.0 volt at the same current density for the same zinc-air battery employing the conventional separator, illustrated by curve B. It is also noted that at current densities in excess of 100 ma./cm.$^2$ and up to 250 ma./cm.$^2$ the voltage of the zinc-air battery employing the invention separator, illustrated by curve A, although decreasing, is substantially greater, and in all cases is in excess of 1.0 volt, as compared to the relatively low voltage, in all cases less than 1.0 volt, for the corresponding battery employing the conventional separator.

EXAMPLE 3

The magnesium oxide-chromium oxide solid solution separator prepared as described in Example 1 was tested in a thermal battery as illustrated in FIG. 6. In the thermal battery, indicated at 80, the magnesium oxide-chromium oxide separator 82 of the invention is saturated with the eutectic of lithium chloride/potassium chloride as electrolyte. The separator 82 is positioned between a lithium anode 84 and a cuprous oxide cathode 86, and the electrodes 84 and 86 are connected in a circuit 88 including a load 90.

Such battery operates at 400 to 1,000° C. and during such period of continuous operation, the battery was cycled more than 35 times over a period of more than 600 hours, demonstrating its secondary (rechargeable) capability.

The following are examples of the preparation of additional embodiments of magnesium oxide-additive solid solutions according to the invention, prepared by procedure similar to that described above in Example 1, the examples below setting forth the presintering temperature for the initial magnesium oxide starting material, the composition of the magnesium oxide-additive mixture, the presintering temperature for such mixture, the final sintering temperature of the compacted separators formed from the presintered mixture, and the temperature to which such separators are cooled following final sintering. The examples also set forth the porosity of the respective separators and their resistivity.

EXAMPLE 4

MgO sintering temp.—1400° C.

|  | Mol percent |
|---|---|
| Magnesia (MgO) | 95.0 |
| $Fe_2O_3$ | 5.0 |
|  | 100.0 |

Presintering temperature—1300° C.
Final sintering temperature—1000° C.
Followed by rapid cooling to 900° C.
Porosity—16.6%
Resistivity—10.7 ohm-cm.

EXAMPLE 5

MgO sintering temp.—900° C.

|  | Mol percent |
|---|---|
| Magnesia | 95.0 |
| $TiO_2$ | 5.0 |
|  | 100.0 |

Presintering temperature—1400° C.
Final sintering temperature—1500° C.
Followed by rapid cooling to 1200° C.
Porosity—15.5%
Resistivity—8.0 ohm-cm.

EXAMPLE 6

MgO sintering temp.—100° C.

| | Mol percent |
|---|---|
| Magnesia | 95.0 |
| $MnO_2$ | 5.0 |
| | 100.0 |

Presintering temperature—1200° C.
Final sintering temperature—1300° C.
Followed by rapid cooling to 1000° C.
Porosity—10.0%
Resistivity—9.0 ohm-cm.

EXAMPLE 7

MgO sintering temp.— 1200° C.

| | Mol percent |
|---|---|
| Magnesia | 95.0 |
| Calcined $Al_2O_3$ | 5.0 |
| | 100.0 |

Presintering temperature—1600° C.
Final sintering temperature—1800° C.
Followed by rapid cooling to 1400° C.
Porosity—29.0%
Resistivity—10.0 ohm-cm.

Results similar to those in Examples 1, 2 and 3 are obtained when the respective magnesium oxide-additive solid solution separators of Examples 4, 5, 6, and 7, respectively, are employed in silver-zinc, zinc-air and thermal cells.

EXAMPLE 8

The procedure of Example 1 is repeated for producing a magnesium oxide-chromium oxide solid solution separator according to the invention except employing a mixture of 85 mol percent magnesia (magnesium oxide) and 15 mol percent chromium oxide.

An improved high strength separator is thus formed having properties and electrical characteristics and providing results similar to those of Examples 1, 2 and 3 when tested in a zinc-silver, zinc-air, and thermal battery according to Examples 1, 2 and 3.

EXAMPLE 9

The procedure of Examples 4 to 7 is repeated except that in each case a mix containing 75 mol percent magnesia and 25 mol percent of the respective additives $Fe_2O_3$, $TiO_2$, $MnO_2$, $Al_2O_3$ are employed.

The resulting respective membranes have properties similar to those of Examples 4, 5, 6 and 7, respectively.

EXAMPLE 10

A battery substantially similar to that described in Example 1 and shown in FIG. 3 of the drawing, and incorporating the magnesium oxide-chromium oxide solid solution separator described in Example 1 is assembled, except that the electrodes are silver and cadmium.

Such a battery also has physical properties and electrical characteristics on the order of those for the battery containing the separator of Example 1.

EXAMPLE 11

A battery substantially similar to that of Example 1 and shown in FIG. 3 of the drawing, is assembled employing the magnesium oxide-chromium oxide solid solution separator of Example 1, except that the electrodes are nickel and cadmium.

Such a battery has physical properties and electrical characteristics similar to the battery containing the magnesium oxide-chromium oxide separator of Example 1.

From the foregoing, it is seen that the invention provides strong highly efficient inorganic separators having a chemical composition and structure, which when incorporated in a battery, particularly into a high energy density alkaline battery such as a silver-zinc battery, a zinc- metal battery such as a zinc-air battery, or a thermal battery employing a molten electrolyte such as molten potassium hydroxide or a eutectic salt, permit extended operation at ambient temperatures as well as at higher temperature of operation, without deterioration of the separators by the electrolyte, and at improved power output. The separators of the invention are particularly characterized by high mechanical strength, high porosity and the ability to control the microporosity to provide desired ion screening, such separators being especially useful in high rate batteries of the types noted above, and can also be employed in conventional lead-acid batteries.

During discharge of batteries such as those illustrated in FIGS. 3 and 4, and described in the above examples, as is well known, the zinc converts to zinc oxide and the silver oxide to silver, and during charging of such batteries the silver is oxidized to silver oxide and the zinc oxide is reduced to zinc. Because of these reversible reactions, the terms "silver" and "zinc," the terms "silver" and "cadmium" and the terms "nickel" and "cadmium," referring to the metals forming the respective electrodes of silver-zinc, silver-cadmium, and nickel-cadmium battery systems, are intended to denote either the respective metals themselves or the corresponding oxides thereof.

Further, the separators of the invention can also be employed in other types of batteries such as the lead-acid, nickel-zinc and non-aqueous electrolyte type batteries.

While we have described particular embodiments of our invention for purposes of illustration, within the spirit of the invention, it will be understood that the invention is not to be taken as limited except by the scope of the appended claims.

We claim:

1. A battery separator comprising a porous membrane consisting essentially of a solid solution of a major proportion of magnesium oxide and a minor proportion of an oxide of an element capable of entering the magnesium oxide crystal lattice, said element having an atomic size within about 12% of the atomic size of magnesium, said oxide being selected from the group consisting of $ZrO_2$, $Cr_2O_3$, $Al_2O_3$, $TiO_2$, $Fe_2O_3$, $Y_2O_3$, ZnO, $Sc_2O_3$, $SnO_2$, NiO, $MnO_2$ $La_2O_3$, CoO, $CeO_2$, and mixtures thereof, said oxide being present in an amount of from about 1 to about 40 molar percent based on the total molecular weight of the magnesium oxide-additive composition, said membrane having a porosity in the range of from about 10% to about 50%.

2. A battery separator as defined in claim 1, said oxide being present in an amount of about 2 to about 15 molar percent, based on the total molecular weight of the magnesium oxide-additive composition.

3. A battery separator as defined in claim 1, wherein said separator is a sintered porous membrane, and said oxide is selected from the group consisting of $ZrO_2$, $Cr_2O_3$, $Al_2O_3$, $TiO_2$ and $Fe_2O_3$ and mixtures thereof.

4. A battery separator as defined in claim 1, wherein said separator is a sintered porous membrane, and said oxide is selected from the group consisting of $ZrO_2$, $Cr_2O_3$, $Al_2O_3$, $TiO_2$, $Fe_2O_3$ and mixtures thereof, and said magnesium oxide is of high purity.

5. A battery separator as defined in claim 1, wherein said separator is a sintered porous membrane.

6. A battery separator as defined in claim 1, wherein said membrane has a pore size in the range from about 1 to about 300 angstroms.

7. A battery separator as defined in claim 1, wherein said membrane has a pore size in the range from about 100 to about 250 angstroms.

8. A battery comprising electrodes and a separator positioned between said electrodes, said separator comprising a porous membrane consisting essentially of a solid solution of a major proportion of magnesium oxide and a minor proportion of an oxide of an element capable of entering the magnesium oxide crystal lattice, said element having an atomic size within about 12% of the atomic size of the magnesium, said oxide being selected from the group consisting of $ZrO_2$, $Cr_2O_3$, $Al_2O_3$, $TiO_2$, $Fe_2O_3$, $Y_2O_3$, ZnO, $Sc_2O_3$, $SnO_2$, NiO, $MnO_2$, $La_2O_3$, CoO, $CeO_2$, and mixtures thereof, said oxide being present in an amount of from about 1 to about 40 molar percent based on the total molecular weight of the magnesium oxide-additive composition, said membrane having a porosity in the range of from about 10% to about 50%.

9. A battery as defined in claim 8, wherein said membrane has a pore size in the range from about 1 to about 300 angstroms.

10. A battery as defined in claim 8, said oxide being present in an amount of about 2 to about 15 molar percent, based on the total molecular weight of the magnesium oxide-additive composition.

11. A battery as defined in claim 8 said separator being a sintered porous membrane.

References Cited

UNITED STATES PATENTS

| | | | |
|---|---|---|---|
| 2,053,369 | 9/1936 | Jeffery | 106—58X |
| 2,165,819 | 7/1939 | Schonberg | 106—58X |
| 2,260,034 | 10/1941 | Krautz | 106—58X |
| 2,276,188 | 3/1942 | Greger | 136—86 |
| 3,361,596 | 1/1968 | Senderoff et al. | 136—153X |
| 3,379,570 | 4/1968 | Berger et al. | 136—146X |

DONALD L. WALTON, Primary Examiner

U.S. Cl. X.R.

106—58